US012217240B1

(12) United States Patent
Chaudhri et al.

(10) Patent No.: US 12,217,240 B1
(45) Date of Patent: Feb. 4, 2025

(54) BAR CODE DETECTION AND AUTHENTICATION FOR CONTACTLESS TRANSACTIONS USING WEARABLE MULTIMEDIA DEVICE

(71) Applicant: Humane, Inc., San Francisco, CA (US)

(72) Inventors: Imran A. Chaudhri, San Francisco, CA (US); Patrick Gates, San Francisco, CA (US); Bethany Bongiorno, San Francisco, CA (US); Yanir Nulman, San Francisco, CA (US); Monique Relova, South San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/334,645

(22) Filed: May 28, 2021

Related U.S. Application Data

(60) Provisional application No. 63/032,520, filed on May 29, 2020.

(51) Int. Cl.
*G06Q 20/32* (2012.01)
*G06Q 20/40* (2012.01)

(52) U.S. Cl.
CPC ....... *G06Q 20/3276* (2013.01); *G06Q 20/321* (2020.05); *G06Q 20/4014* (2013.01)

(58) Field of Classification Search
CPC ............ G06Q 20/3276; G06Q 20/321; G06Q 20/4014

(Continued)

(56) References Cited

U.S. PATENT DOCUMENTS 9,760,871 B1 * 9/2017 Pourfallah ............. G06Q 10/10
10,332,096 B2 * 6/2019 Tilahun ............. G06Q 20/3223
(Continued)

FOREIGN PATENT DOCUMENTS

WO   WO-2016183508 A1 * 11/2016 ............. G06Q 20/32
WO   WO-2019003074 A1 *  1/2019 ......... A61B 10/0051

OTHER PUBLICATIONS

S. Lin, H. F. Cheng, W. Li, Z. Huang, P. Hui and C. Peylo, "Ubii: Physical World Interaction Through Augmented Reality," in IEEE Transactions on Mobile Computing, vol. 16, No. 3, pp. 872-885, Mar. 1, 2017. (Year: 2017).*

(Continued)

*Primary Examiner* — Virpi H Kanervo
(74) *Attorney, Agent, or Firm* — Fish & Richardson P.C.

(57) ABSTRACT

In an embodiment, a wearable multimedia device, comprises: a housing configured to attach to clothing of a user; a wide field-of-view camera embedded in the housing; one or more processors; memory storing instructions that when executed by the one or more processors, causes the one or more processors to perform operations comprising: capturing, using the camera, an image of a scene that includes a bar code displayed by a terminal device; determining an intent of the user to read the bar code; in accordance with the user's intent to read the barcode: cropping the barcode from the image of the scene; establishing, using the bar code, a communication channel with the terminal device; receiving, using the communication channel, transaction data from the terminal device; and responsive to the transaction data, sending, using the communication channel, authentication credentials to the terminal device.

20 Claims, 4 Drawing Sheets

(58) Field of Classification Search
USPC .............................................. 507/44; 705/44
See application file for complete search history.

(56) References Cited

U.S. PATENT DOCUMENTS

| | | | |
|---|---|---|---|
| 10,600,060 B1* | 3/2020 | Schiffman | G06F 18/22 |
| 11,048,977 B1* | 6/2021 | Ulbricht | G06V 10/98 |
| 2019/0180270 A1* | 6/2019 | Ericson | G06Q 20/4014 |

OTHER PUBLICATIONS

S. Seneviratne et al., "A Survey of Wearable Devices and Challenges," in IEEE Communications Surveys & Tutorials, vol. 19, No. 4, pp. 2573-2620, Fourthquarter 2017. (Year: 2017).*

E. A. Bernal et al., "Deep Temporal Multimodal Fusion for Medical Procedure Monitoring Using Wearable Sensors," in IEEE Transactions on Multimedia, vol. 20, No. 1, pp. 107-118, Jan. 2018. (Year: 2018).*

G. Peng, G. Zhou, D. T. Nguyen, X. Qi, Q. Yang and S. Wang, "Continuous Authentication With Touch Behavioral Biometrics and Voice on Wearable Glasses," in IEEE Transactions on Human-Machine Systems, vol. 47, No. 3, pp. 404-416, Jun. 2017. (Year: 2017).*

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, Ga, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

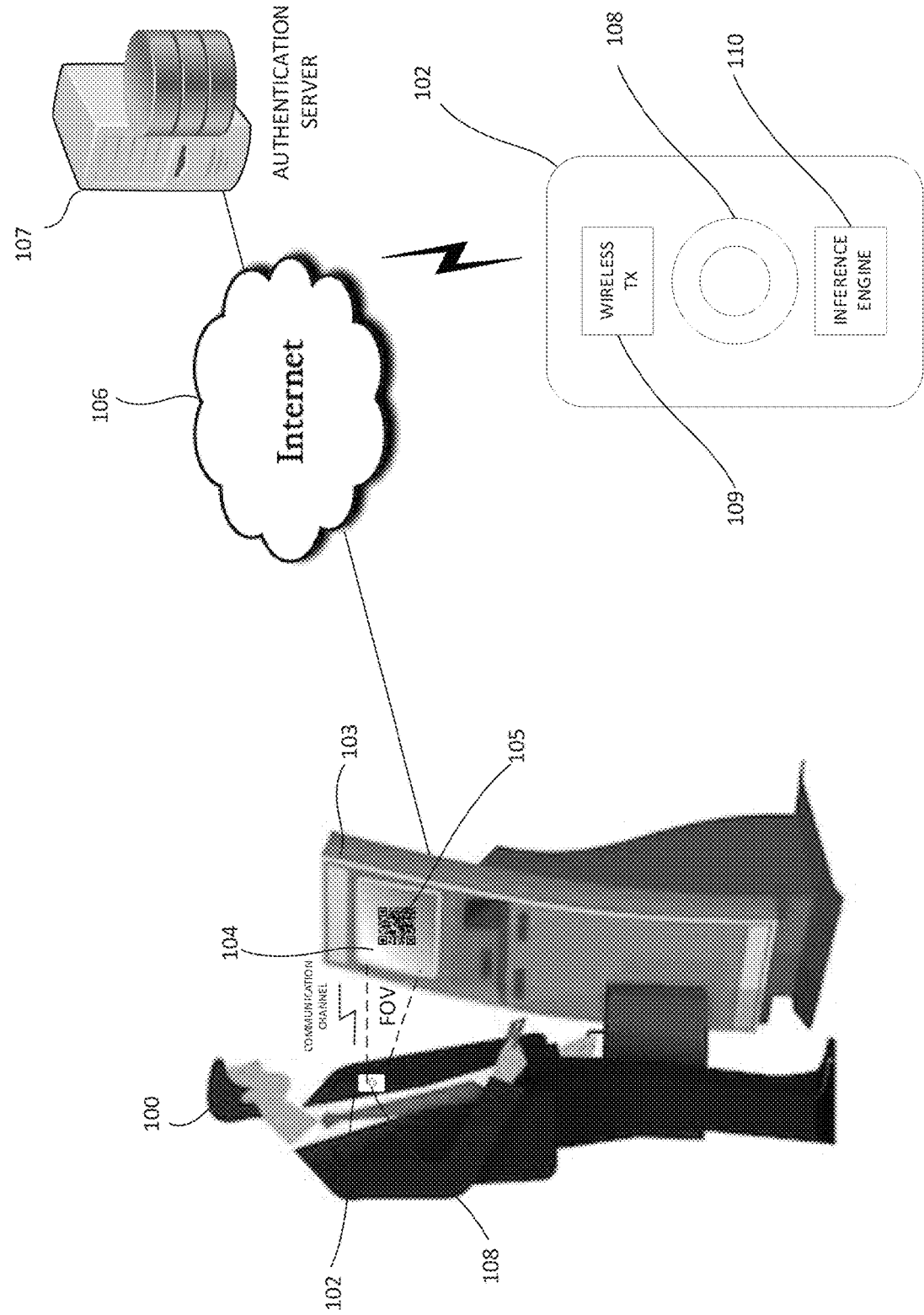

BAR CODE DETECTION AND AUTHENTICATION FOR CONTACTLESS TRANSACTIONS USING WEARABLE MULTIMEDIA DEVICE

CROSS-REFERENCE TO RELATED APPLICATION

This application claims priority to U.S. Provisional Patent Application No. 63/032,520, filed May 29, 2020, the entire contents of which are incorporated herein by reference.

TECHNICAL FIELD

This disclosure relates generally to bar code technology and contactless transaction systems and methods.

BACKGROUND

Modern mobile devices (e.g., smart phones, tablet computers, wearable computers) include an embedded camera that allows a user to capture digital images. These devices include bar code readers and applications for electronic payment using Near Field Communications (NFC) technology. Such applications require the user to manually invoke a payment application to display a bar code (e.g., a bar code, quick response (QR) code) on a hardware display of the device (e.g., a smartphone liquid crystal display (LCD)), and then place the display with the bar code in proximity to the bar code reader at the point of sale (POS) to initiate and complete a payment transaction.

SUMMARY

Systems, methods, devices and non-transitory, computer-readable storage mediums are disclosed for bar code detection and authentication for contactless transactions using a wearable multimedia device.

In an embodiment, a wearable multimedia device, comprises: a housing configured to attach to clothing of a user; a wide field-of-view camera embedded in the housing; one or more processors; memory storing instructions that when executed by the one or more processors, causes the one or more processors to perform operations comprising: capturing, using the camera, an image of a scene that includes a bar code displayed by a terminal device; determining an intent of the user to read the bar code; in accordance with the user's intent to read the barcode: cropping the barcode from the image of the scene; establishing, using the bar code, a communication channel with the terminal device; receiving, using the communication channel, transaction data from the terminal device; and responsive to the transaction data, sending, using the communication channel, authentication credentials to the terminal device.

Particular embodiments disclosed herein provide one or more of the following advantages. A wearable multimedia device that includes an embedded camera with a wide field-of-view (FOV) and no physical hardware display, can quickly capture an image of a bar code (e.g., bar code, QR code) from a contactless display and authenticate the wearable multimedia device with another device or system for payment or access transactions, or any other contactless transaction. Moreover, the user is not required to manually invoke a payment application to display a bar code on a hardware display of the device or place the display with the bar code in proximity to the bar code reader at the POS to initiate and complete a payment transaction.

The details of the disclosed embodiments are set forth in the accompanying drawings and the description below. Other features, objects and advantages are apparent from the description, drawings and claims.

DESCRIPTION OF DRAWINGS

FIGS. 1A and 1B illustrate a user interacting with a contactless payment terminal using a wearable multimedia device that includes an embedded camera, according to an embodiment.

The same reference symbol used in various drawings indicates like elements.

DETAILED DESCRIPTION

Example Wearable Multimedia Device

Figure 1C:
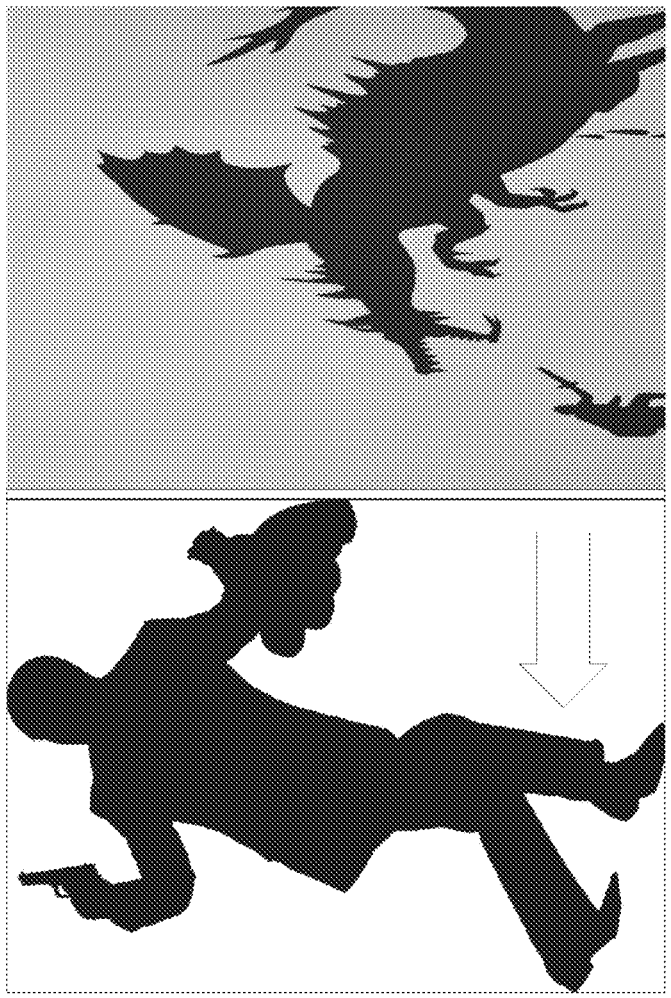
FIG. 1C illustrates a user interacting with a media playback device using a wearable multimedia device that includes an embedded camera, according to an embodiment.

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet or any other attachment mechanism. The wearable multimedia device includes a digital image capture device (e.g., 120° FOV with optical image stabilizer (OIS)) that allows a user to spontaneously capture multimedia data (e.g., video, audio, depth data) of life events and document transactions with minimal user interaction or device set-up.

The multimedia data captured by the wireless multimedia device is processed locally or uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes). In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device can also include one or more environmental sensors, including but not limited to: an ambient light sensor, magnetometer, pressure sensor, voice activity detector, etc.

In an embodiment, the wearable multimedia device can include one or more biometric sensors, such as a heart rate sensor, fingerprint scanner, etc. Biometric sensor data can be included in the context data to document a transaction or to indicate the emotional state or health of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television, contactless payment/access terminal, other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures, etc.

In an embodiment, the wearable multimedia device includes a projector (e.g., a laser projector, LCoS, DLP, LCD), or can be wired or wirelessly coupled to an external projector, that allows the user to replay a moment on a surface such as a wall, table top or the palm of the user's hand.

In an embodiment, the wearable multimedia device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the wearable multimedia device does not include a hardware display and utilizes the camera and a depth sensor for gesture recognition and control, where the camera can detect and recognize hand and finger poses (e.g., finger pointing direction in 3D space). The camera image is processed using computer vision and/or machine learning models to estimate or predict/classify/annotate 2D bounding boxes of detected objects in the image.

In an embodiment, the image is sent to a network-based server computer that has one or more machine learning models trained to predict labels for 2D bounding boxes for the objects and confidence scores. An example of a machine learning model that performs instance segmentation is the Mask Regional Convolutional Neural Network (R-CNN). The framework of the Mask R-CNN is based on two stages: first, it scans the image to generate proposals; which are areas with a high likelihood to contain an object. Second, it classifies these proposals and creates bounding boxes and masks. Other instance image segmentation algorithms can also be used.

To protect user and third party privacy, in an embodiment semantic segmentation is first performed on the device to predict object masks but not label the objects. Then only the object data (pixel data within mask) is sent to the server for instance segmentation rather than the entire image frame. In an embodiment, the outbound unlabeled objects and the inbound labeled objects are encrypted before leaving the device or server.

In an embodiment, known 3D object detection deep learning networks, such as PointRNN or VoxelNet can be used to detect and label 3D objects in a point cloud either on the device or on a network-based server computer.

In an embodiment, the wearable multimedia device performs sensor fusion of 3D depth data an 2D image data, where the 3D depth data (e.g., 2D or 3D bounding box coordinates and dimensions) are projected into the 2D image (using extrinsic and intrinsic calibration matrices), so that user gestures can be associated with labeled objects in the 2D image.

System Overview

FIG. 1A illustrates a user 100 interacting with contactless payment terminal 103 using a wearable multimedia device 102. Contactless payment terminal 103 includes a display screen or surface 104 that displays bar code 105. Wearable multimedia device 102 includes embedded camera 108 and wireless transceiver 109, as shown in FIG. 1B.

In an example use case, when user 100 approaches payment terminal 103, embedded camera 108 captures a wide FOV image that includes bar code 105. In the example shown, bar code 105 can be a one-dimensional or two-dimensional bar code, such as Code 39, Code 128, interleaved 2 of 5, QR, UPC, EAN, PDF417, Data Matrix, and any other barcode type. Hereinafter, the 1D and 2D bar codes described above are collectively referred to as "bar codes."

Inference engine 110 running on device 102 (see FIG. 1B) recognizes the intent of user 100 to make a transaction with contactless payment terminal 103. In response to determination of the user's intent, embedded camera 108 automatically crops bar code 105 from the wide FOV image and establishes a short-range wireless communication session with payment terminal 103 (e.g., WiFi, Bluetooth) using wireless transceiver 109, and then participates in an authentication process with contactless payment terminal 103.

During the authentication process, wearable multimedia device 102 receives transaction details from contactless payment terminal 103 and responds by sending authentication credentials. Contactless payment terminal 103 uses the authentication credentials to authenticate the wearable multimedia device 102 using, for example, a third party network authentication server. In an embodiment, the publicly known NFC protocol (e.g., ISO/IEC 18092) can be used for authentication and implementing the steps of the payment transaction in a secure manner. Other communication protocols can also be used (e.g., WiFi and Bluetooth protocols).

In an embodiment, inference engine 110 uses a variety of sensor data to infer the intent of user 100 to perform a payment transaction, including but not limited to: images from the embedded camera 108, GNSS position coordinates of wearable multimedia device 102 (e.g., provided by a GNSS receiver), motion data from inertial sensors (e.g., accelerometer, gyro, magnetometer, altimeter) and depth data from a depth sensor (e.g., TOF sensor). For example, camera images and/or depth data can be used to determine a user's hand/finger gestures, such as pointing to a contactless transaction terminal 103.

In an embodiment, the user speech captured by one or more microphones of wearable multimedia device 102 is parsed and converted to text which is used to infer user intent. For example, the user could say, "I want to buy a pass." Inference engine 110 interprets the phrase with other context data, such as a pointing gesture, to infer the user's intent to engage in a payment transaction with contactless payment terminal 103. In an embodiment, the authentication process uses a variety of sensor data to perform authentication. For example, a fingerprint scanner or camera (e.g., Face ID) of wearable multimedia device 102 can be used as a primary or secondary factor in a two-factor authentication process.

Although the example use case described above was for a payment transaction, the disclosed embodiments can be used in any application where wireless short-range communication and authentication is desired, including any application where NFC, Bluetooth or WiFi is used. Some example applications include but are not limited to: contactless token applications where information is obtained from tags that can be attached to an object, such as movie posters, grocery store specials, etc., ticketing/micropayment applications to validate a purchased ticket or make payments in retail stores, pairing the wearable multimedia device with other devices to facilitate further communication using a higher bandwidth/longer range communication technology, such as WiFi, Bluetooth, etc., secure authentication where the wearable multimedia device establishes a secure communication channel with another device to grant access to a user in a secure access control system or when logging onto a computer terminal, and to control of other devices, such as control of media playback devices (e.g., a television, computer), as described below in reference to FIG. 1C.

An advantage of the bar code detection and authentication system over conventional bar code scanning technology, is that the transaction terminal displays the bar code, and the wearable multimedia device operates as a bar code reader. Sensors and location technology on the wearable multimedia device are used to infer user intent. If the inferred user intent is related to a particular transaction terminal, the bar code displayed by the transaction terminal is automatically cropped from the image and decoded to obtain the bar code data. The wearable multimedia device then uses the barcode data to automatically authenticate the wearable multimedia device and perform a transaction with the transaction terminal. The technology is not only easier to use but will facilitate faster transactions and access to structures, making the technology equally advantageous for businesses and government entities.

Another advantage of the bar code detection and authentication system over conventional bar code scanning technology, is that detection and authentication occurs over longer distances (e.g., 6 feet) versus other contactless systems like NFC that require the user to be closer to people or devices with readers. This increased detection and authentication distance is useful for social distancing that may occur during health emergencies (e.g., a pandemic), and also allows users with physical disabilities (e.g., wheelchair bound users, visually impaired) to enjoy the benefits of contactless transactions.

Communication Authentication with Media Playback Device

FIG. 1C illustrates a user interacting with a media playback device using a wearable multimedia device that includes an embedded camera, according to an embodiment. In the example shown, wearable multimedia device 102 is used to establish communication with media playback device 111, perform an authentication process with media playback device 111, and then allow the user to control media playback device 111 using hand/finger gestures. Inference engine 110 infers the intent of user 100 to control media playback device 111 based on user gestures captured by embedded camera 108 and a depth sensor and/or other context data (e.g., location and heading of the user relative to the media playback device).

In this use case, the media playback device (e.g., a television, set-top box, digital media receiver) displays a bar code, which is captured in an image by embedded camera 108. After a successful authentication process using decoded bar code data (See description for FIGS. 1A, 1B and 2 below), the user can control the media playback device using hand and/or finger gestures, such as touchless swiping left to right or right to left to change the displayed content (e.g., photos in a photo gallery or slideshow), as shown in FIG. 1C. Touchless swiping can be used for any desired task including but not limited to: scrolling through content, menus, navigating TV guides, scrubbing video or adjusting playback or recording controls (e.g., adjust volume, contrast and brightness, record, pause, fast forward, reverse, skip, etc.).

In an embodiment, the rate of swiping influences how fast the content changes: faster swiping results in faster content change (e.g., faster channel surfing) and vice-versa. Touchless swiping gestures can be made in any desired direction or pattern, including horizontally, vertically and diagonally. In addition to swiping gestures, any other touchless input can be used to control the media playback device, including but not limited to: tapping, double tapping, flicking, dragging, pinch open, pinch close, touch and hold, two-fingers scroll, pan, rotate, scroll, and any gesture that could be used on a touch screen or surface.

In an embodiment, swiping is detected by projecting each pixel in a depth image captured by a depth sensor (e.g., TOF camera) into 3D space using camera intrinsic parameters (e.g., optical center, focal length, skew coefficient) to generate a point cloud of 3D data points (e.g., x, y, z coordinates), reducing the point cloud to make the 3D data points more spatially uniform, merging all 3D data points that correspond to the same voxel into one voxel, dividing the 3D points into clusters (e.g., using a Euclidian cluster extraction algorithm), deleting clusters with too few points (e.g., less than 200 points) to remove noise and outlier points, identifying for each remaining cluster if the cluster includes a left hand or right hand by checking from which side the arm enters the frame. This is done by counting the number of points in the left and right third of the image frame, and whichever side has more points determines if the hand cluster is a left or right hand.

Next, arm points are removed from the hand cluster to form a new hand point cloud. In an embodiment, this is accomplished by starting from the furthest 3D data point from the camera, and adding up the visible surface area until a specified surface area dimension is reached (e.g., 140 $cm^2$). A dominant axis of the hand point cloud is then determined that represents the hand direction. In an embodiment, the dominant axis of the hand point cloud is determined by computing a least squares fit of a line to the 3D data points in the hand point cloud.

After the hand and hand direction are determined, the system monitors for a swipe gesture by measuring the acceleration of the hand and comparing the acceleration to a threshold value that is indicative of a swipe gesture. To distinguish between a double swipe in a single direction from an alternating left/right or right/left swipe, a dwell time between hand movements is measured. Based on the dwell time, a double swipe or a single swipe in the opposite direction is determined.

In an embodiment, the display will present visual feedback to the user regarding the progress of the swiping action and other visual aids to teach the user how to swipe for best results. In other embodiments, audio or force feedback is provided. For example, a haptic engine in the wearable multimedia device can generate a vibration or vibration pattern that indicates progress in scrolling or for any other gesture. Audio can be output from a loudspeaker of the wearable multimedia device that includes a sound effect that is related to the gesture. A different sound effect can be associated with each gesture. The sound effect informs the user that the gesture they intended to trigger was in fact triggered.

Example Process

Figure 2:
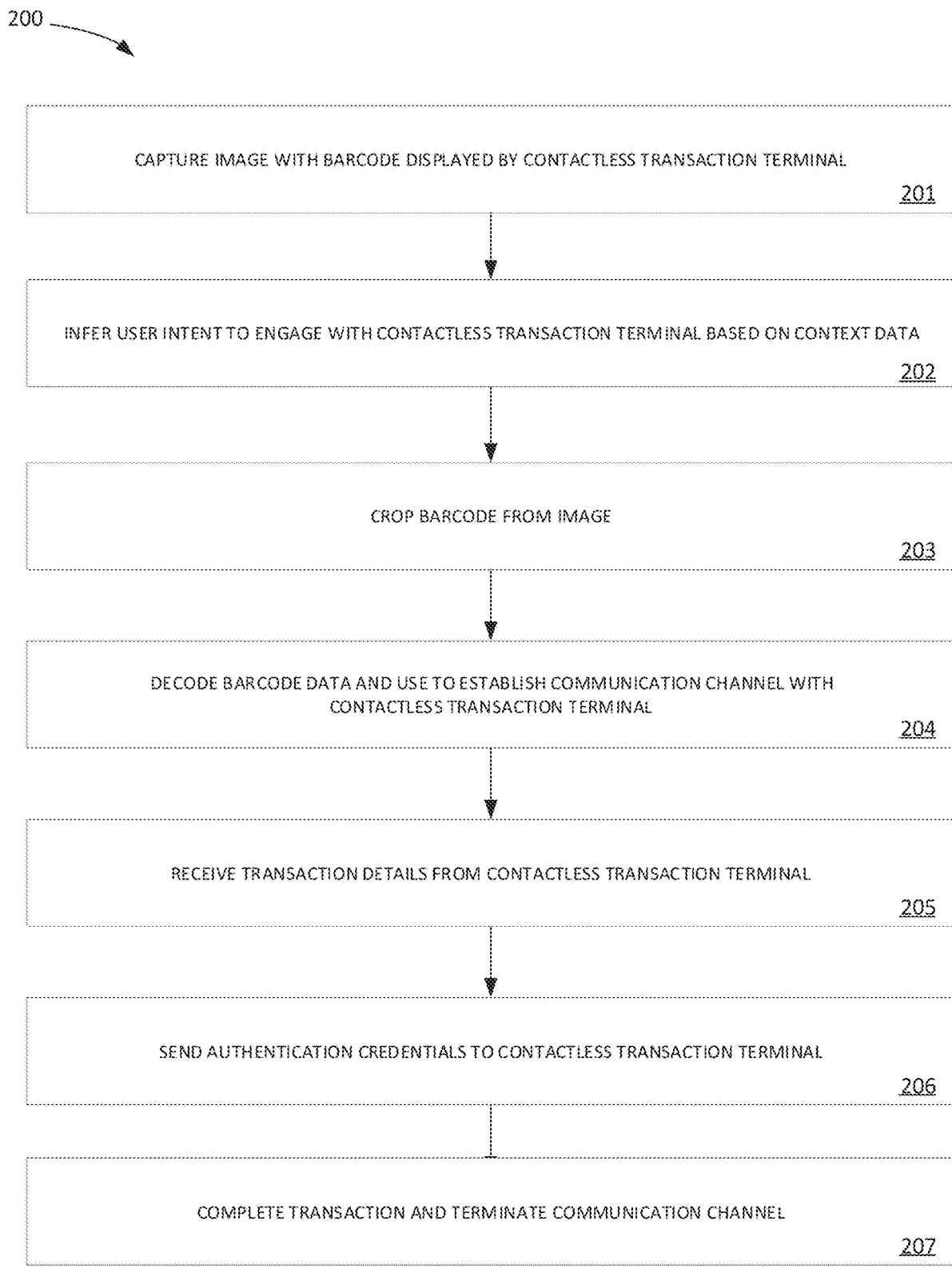
FIG. 2 is a flow diagram of a process of barcode detection and authentication for contactless transactions using a wearable multimedia device, according to an embodiment.

FIG. 2 is a flow diagram of a process 200 of barcode detection and authentication for contactless transactions using a wearable multimedia device, according to an embodiment. Process 200 can be implemented by, for example, device architecture 300, as described in reference to FIG. 3.

Process 200 can begin by capturing an image with a barcode displayed by a contactless transaction terminal (201). For example, an embedded camera of the wearable multimedia device can capture a wide FOV image that includes a display screen of a transaction terminal that has a barcode (e.g., QR code) displayed.

Process 200 continues by inferring user intent to engage with the contactless transaction terminal based on context data (202). For example, the camera image and depth sensor data (e.g., captured by a TOF camera) can be used to infer that the user is gesturing in the direction at the contactless transaction terminal, and intends to engage with the contactless transaction terminal. In an embodiment, user speech is also used to infer the user's intent to engage with the contactless transaction terminal.

In an embodiment, the camera image and depth data are also used to determine the type of contactless transaction terminal. For example, if the contactless transaction terminal is an automated teller machine (ATM), the inference engine 110 infers that the user wants to perform a banking transaction. In an embodiment, instance segmentation (e.g., Mask R-CNN) is used to identify the type of contactless transaction terminal from a camera image and/or depth data.

Other context data, such as the location, speed and heading of the user with respect to the contactless transaction terminal can be used to infer user intent. For example, if the user has stopped or slowed down when in front of the transaction terminal, inference engine 110 infers that the user intends to engage with the transaction terminal. If the heading of the user suggests that she is approaching the contactless transaction terminal, an inference is made that she intends to engage the contactless transaction terminal. In an embodiment, past history of transactions at the transaction terminal by the user are used to infer the intent of the user to engage the transaction terminal. For example, if the user has used the ATM machine in the past, inference engine 111 can use that information to infer that the user intends to use the ATM machine.

Process 200 continues by cropping the barcode from the image (203), decoding the barcode data from the barcode and using the barcode data to establish a wireless communication session with the contactless transaction terminal (204). For example, data encoded in the cropped bar code (e.g., a QR code) can identify a mode of communication with the terminal, such as a Uniform Resource Locator (URL) or NFC, Bluetooth or WiFi protocol.

Process 200 continues by receiving transaction details from the contactless transaction terminal (205), sending authentication credentials to the contactless transaction terminal (206) and completing the transaction and terminating the session (207). For example, standardized communication protocols (e.g., NFC, Bluetooth, WiFi protocols) can be used to establish the session, authenticate the wearable multimedia device, complete the transaction and terminate the session.

Example Mobile Device Architecture

Figure 1C:
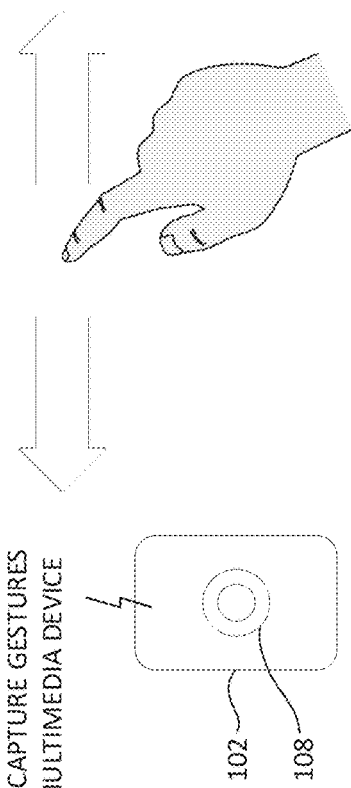
Figure 3:
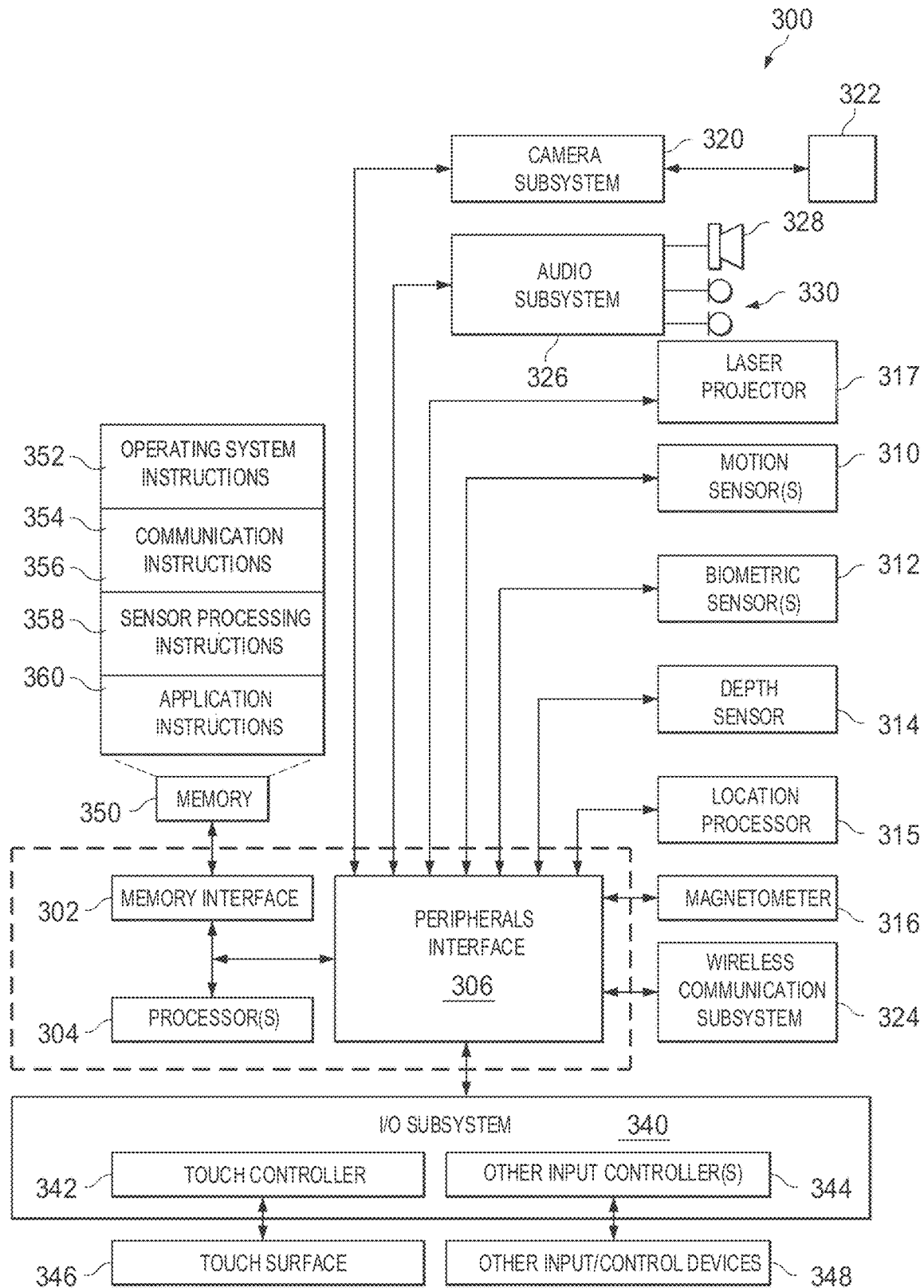
FIG. 3 is an architecture for a wearable multimedia device that implements the features and processes described in reference to FIGS. 1 and 2, according to an embodiment.

FIG. 3 is a block diagram of example device architecture 300 for a mobile device implementing the features and processes described in reference to FIGS. 1 and 2. Architecture 300 may include memory interface 302, data processor(s), image processor(s) or central processing unit(s) 304, and peripherals interface 306. Memory interface 302, processor(s) 304 or peripherals interface 306 may be separate components or may be integrated in one or more integrated circuits. One or more communication buses or signal lines may couple the various components.

Sensors, devices, and subsystems may be coupled to peripherals interface 306 to facilitate multiple functions. For example, laser projector 317, motion sensor(s) 310, biometric sensor(s) 312, depth sensor 314 may be coupled to peripherals interface 306 to facilitate motion, orientation, biometric and depth detection functions. In some implementations, motion sensor(s) 310 (e.g., an accelerometer, rate gyroscope) may be utilized to detect movement and orientation of the wearable multimedia device.

Other sensors may also be connected to peripherals interface 306, such as environmental sensor(s) (e.g., temperature sensor, barometer, ambient light) to facilitate environment sensing functions. For example, a biometric sensor 312 can detect fingerprints, face recognition, heart rate and other fitness parameters. In an embodiment, a haptic motor (not shown) can be coupled to the peripheral interface, which can provide vibration patterns as haptic feedback to the user.

Location processor 315 (e.g., GNSS receiver chip) may be connected to peripherals interface 306 to provide georeferencing. Electronic magnetometer 316 (e.g., an integrated circuit chip) may also be connected to peripherals interface 306 to provide data that may be used to determine the direction of magnetic North. Thus, electronic magnetometer 316 may be used by an electronic compass application.

Camera subsystem 320 and an optical sensor 322, e.g., a charged coupled device (CCD) or a complementary metal-oxide semiconductor (CMOS) optical sensor, may be utilized to facilitate camera functions, such as recording photographs and video clips, and detecting bar codes, as described in reference to FIGS. 1 and 2. In an embodiment, the camera has a wide FOV (e.g., 180° FOV) and optical image stabilization (OIS). The depth sensor can include an infrared emitter that projects dots in a known pattern onto an object/subject. The dots are then photographed by a dedicated infrared camera and analyzed to determine depth data. An embodiment, a time-of-flight (TOF) camera can be used to resolve distance based on the known speed of light and measuring the TOF of a light signal between the camera and an object/subject for each point of the image.

Communication functions may be facilitated through one or more communication subsystems 324. Communication subsystem(s) 324 may include one or more wireless communication subsystems. Wireless communication subsystems 324 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 324 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 324 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 326 may be coupled to a loudspeaker 328 and one or more microphones 330 to facilitate voice-enabled functions, such as voice recognition, voice replication, digital recording, telephony functions and beamforming.

I/O subsystem 340 may include touch controller 342 and/or another input controller(s) 344. Touch controller 342 may be coupled to a touch surface 346. Touch surface 346 and touch controller 342 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 346. In one implementation, touch surface 346 may display virtual or soft buttons, which may be used as an input/output device by the user.

Other input controller(s) 344 may be coupled to other input/control devices 348, such as one or more buttons, rocker switches, thumb-wheel, infrared port, USB port, and/or a pointer device such as a stylus. The one or more buttons (not shown) may include an up/down button for volume control of speaker 328 and/or microphone 330.

In some implementations, device 300 plays back to a user recorded audio and/or video files, such as MP3, AAC, and MPEG video files. In some implementations, device 300 may include the functionality of an MP3 player and may include a pin connector or other port for tethering to other devices. Other input/output and control devices may be used. In an embodiment, device 300 may include an audio processing unit for streaming audio to an accessory device over a direct or indirect communication link.

Memory interface 302 may be coupled to memory 350. Memory 350 may include high-speed random access memory or non-volatile memory, such as one or more magnetic disk storage devices, one or more optical storage devices, or flash memory (e.g., NAND, NOR). Memory 350 may store operating system 352, such as Darwin, RTXC, LINUX, UNIX, OS X, IOS, WINDOWS, or an embedded operating system such as VxWorks. Operating system 352 may include instructions for handling basic system services and for performing hardware dependent tasks. In some implementations, operating system 352 may include a kernel (e.g., UNIX kernel).

Memory 350 may also store communication instructions 354 to facilitate communicating with one or more additional devices, one or more computers or servers, including peer-to-peer communications with wireless accessory devices, as described in reference to FIGS. 1-2. Communication instructions 354 may also be used to select an operational mode or communication medium for use by the device, based on a geographic location of the device.

Memory 350 may include sensor processing instructions 358 to facilitate sensor-related processing and functions and application instructions 360 to facilitate the features and processes, described in reference to FIGS. 1-2. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 350 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java, SWIFT), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An apparatus, comprising:
a wearable multimedia device worn by a user comprising:
  a housing;
  a wide field-of-view camera embedded in the housing;
  a depth sensor;
  one or more processors; and
  a memory storing instructions that when executed by the one or more processors, causes the one or more processors to perform operations comprising:
    capturing, using the camera, an image of a scene that includes a plurality of unlabeled objects and a user gesture;
    capturing, using the depth sensor, depth data of the scene;
    performing semantic segmentation on the image of the scene to predict an object mask for each unlabeled object;
    performing instance segmentation on pixel data within the each object mask;
    labeling, based on the instance segmentation, that one of the plurality of unlabeled objects is a contactless terminal device;
    associating, with sensor fusion, an intent of the user to engage with the contactless terminal device based at least in part on the labeled contactless terminal device, the depth data, and the user gesture, where the user gesture is the user pointing in a direction of the contactless terminal device;
    establishing a communication channel between the wearable multimedia device and the contactless terminal device;
    receiving, using the communication channel, data from the contactless terminal device;
    responsive to the received data, sending, using the communication channel, authentication credentials to the contactless terminal device;
    receiving, using the communication channel, access from the contactless terminal device based at least in part on the authentication credentials; and
    responsive to the received access to the contactless terminal device, performing an interaction with the contactless terminal device.

2. The apparatus of claim 1, further comprising:
searching for a bar code in the image of the scene; and
  automatically cropping the bar code from the image of the scene; and
establishing, using the bar code, the communication channel between the wearable multimedia device and the terminal device.

3. The apparatus of claim 2, wherein the bar code is a quick response (QR) code.

4. The apparatus of claim 2, wherein the bar code is displayed on a monitor of the contactless terminal device.

5. The apparatus of claim 1, wherein the image of the scene captured by the camera and the depth data of the scene captured by a depth sensor of the wearable multimedia device are used to determine that the user is gesturing.

6. The apparatus of claim 1, wherein determining the intent of the user to engage with the contactless terminal device further comprises determining that the gesture is the user pointing their hand or finger in the direction of the contactless terminal device.

7. The apparatus of claim 1, wherein the image of the scene captured by the camera and user speech captured by a microphone of the wearable multimedia device at the scene are used to determine the intent of the user to engage with the contactless terminal device.

8. The apparatus of claim 1, wherein the image of the scene captured by the camera, user speech captured by a microphone of the wearable multimedia device, and depth data captured by the depth sensor of the wearable multimedia device at the scene are used to determine the intent of the user to engage with the contactless terminal device.

9. The apparatus of claim 1, wherein at least one of location, speed or direction of the user captured by at least one sensor of the wearable multimedia device is used to determine the intent of the user to engage with the contactless terminal device.

10. The apparatus of claim 1, wherein the image of the scene captured by the camera or depth data captured by a depth sensor of the wearable multimedia device is used to determine a type of the contactless terminal device.

11. The apparatus of claim 1, wherein a past history of communications with the contactless terminal device is used to determine the intent of the user to engage with the contactless terminal device.

12. The apparatus of claim 1, wherein the authentication credentials include biometric sensor data.

13. The apparatus of claim 1, further comprising:
processing, using a machine learning model, the image of the scene to detect and label the contactless terminal device in the scene.

14. The apparatus of claim 1, further comprising:
after authentication of the wearable multimedia device by the contactless terminal device using the authentication credentials, capturing a control gesture of the user; and
sending control data to the contactless terminal device for controlling the contactless terminal device based on the control gesture.

15. The apparatus of claim 14, wherein the contactless terminal device is a media playback device and the control gesture is a swipe gesture for changing content played on the media playback device.

16. The apparatus of claim 15, wherein a speed of the swipe gesture controls a speed of the content changing.

17. A method comprising:
capturing, using a wide field-of-view camera of a wearable multimedia device worn by a user, an image of a scene that includes a plurality of unlabeled objects and a user gesture, wherein the wearable multimedia device comprises a housing, the wide field-of-view camera embedded in the housing, a depth sensor, one or more processors, and a memory storing instructions that are executed by the one or more processors;
capturing, by the one or more processors using the depth sensor, depth data of the scene;
performing, by the one or more processors, semantic segmentation on the image of the scene to predict an object mask for each unlabeled object;
performing, by the one or more processors, instance segmentation on pixel data within the each object mask;
labeling, by the one or more processors based on the instance segmentation, that one of the plurality of unlabeled objects is a contactless terminal device;
associating, by the one or more processors with sensor fusion, an intent of the user to engage with the contactless terminal device based at least in part on the user gesture, the depth data and the labeled contactless terminal device, where the user gesture is the user pointing in a direction of the contactless terminal device;
establishing, by the one or more processors, a communication channel between the wearable multimedia device and the contactless terminal device;
receiving, by the one or more processors using the communication channel, data from the contactless terminal device;
responsive to the received data, sending, using the communication channel, authentication credentials to the contactless terminal device;
receiving, by the one or more processors using the communication channel, access from the contactless terminal device based at least in part on the authentication credentials; and
responsive to the received access to the contactless terminal device, performing, by the one or more processors, an interaction with the contactless terminal device.

18. The method of claim 17, further comprising:
searching, by the one or more processors, for a bar code in the image of the scene;
automatically cropping, by the one or more processors, the bar code from the image of the scene; and
establishing, by the one or more processors using the bar code, the communication channel between the wearable multimedia device and the terminal device.

19. The method of claim 17, wherein determining the intent of the user to engage with the contactless terminal device further comprises determining, by the one or more processors, that the gesture is the user pointing their hand or finger in the direction of the contactless terminal device.

20. The method of claim 17, wherein the image of the scene captured the camera and user speech captured by a microphone of the wearable multimedia device at the scene are used to determine, by the one or more processors, the intent of the user to engage with the contactless terminal device.

* * * * *

UNITED STATES PATENT AND TRADEMARK OFFICE
CERTIFICATE OF CORRECTION

| | | |
|---|---|---|
| PATENT NO. | : 12,217,240 B1 | Page 1 of 1 |
| APPLICATION NO. | : 17/334645 | |
| DATED | : February 4, 2025 | |
| INVENTOR(S) | : Imran A. Chaudhri et al. | |

It is certified that error appears in the above-identified patent and that said Letters Patent is hereby corrected as shown below:

In the Claims

Column 14, Line 38, In Claim 20, before "the" insert --by--.

Signed and Sealed this
Sixth Day of May, 2025

Coke Morgan Stewart
*Acting Director of the United States Patent and Trademark Office*